United States Patent
Sedlar et al.

(10) Patent No.: US 8,052,152 B2
(45) Date of Patent: Nov. 8, 2011

(54) DYNAMIC SHAFT SEAL AND METHOD OF INSTALLATION THEREOF

(75) Inventors: Brent Ryan Sedlar, Ann Arbor, MI (US); David Michael Toth, Brighton, MI (US); Ronald Maurice Noteboom, II, Lenox, MI (US)

(73) Assignee: Federal-Mogul Corporation, Southfield, MI (US)

( * ) Notice: Subject to any disclaimer, the term of this patent is extended or adjusted under 35 U.S.C. 154(b) by 721 days.

(21) Appl. No.: 12/044,252

(22) Filed: Mar. 7, 2008

(65) Prior Publication Data

US 2008/0217865 A1    Sep. 11, 2008

Related U.S. Application Data

(60) Provisional application No. 60/894,040, filed on Mar. 9, 2007.

(51) Int. Cl.
*F16J 15/32* (2006.01)
(52) U.S. Cl. .......................... 277/561; 277/530; 277/572
(58) Field of Classification Search .................. 277/561, 277/564, 611, 567, 438, 530, 572
See application file for complete search history.

(56) References Cited

U.S. PATENT DOCUMENTS

| | | | |
|---|---|---|---|
| 2,181,203 A * | 11/1939 | Reynolds | 277/504 |
| 2,465,175 A * | 3/1949 | Schwarz et al. | 277/562 |
| 2,482,029 A * | 9/1949 | Reynolds | 277/504 |
| 2,635,907 A | 4/1953 | Heimbuch | |
| 2,665,151 A * | 1/1954 | Fisler et al. | 277/530 |
| 2,697,623 A | 12/1954 | Mosher | |
| 2,731,284 A | 1/1956 | Chambers, Jr. et al. | |
| 2,736,583 A | 2/1956 | Marvin | |
| 2,736,585 A | 2/1956 | Riesing | |
| 2,736,586 A | 2/1956 | Riesing | |
| 2,743,950 A | 5/1956 | Helfrecht et al. | |
| 2,797,944 A | 7/1957 | Riesing | |
| 3,049,356 A | 8/1962 | Talamonti | |
| 3,117,796 A * | 1/1964 | Liebig | 277/574 |
| 3,356,376 A | 12/1967 | Bradfute et al. | |
| 3,390,890 A * | 7/1968 | Kurtz | 277/625 |
| 3,572,734 A * | 3/1971 | Holt | 277/556 |
| 3,623,738 A * | 11/1971 | MacDonnell | 277/356 |
| 3,822,890 A | 7/1974 | Bourgeois | |

(Continued)

FOREIGN PATENT DOCUMENTS

JP    2000-320689    11/2000

*Primary Examiner* — Alison Pickard
(74) *Attorney, Agent, or Firm* — Dickinson Wright PLLC; Robert L. Stearns

(57) ABSTRACT

A shaft seal for forming a dynamic seal along an axially extending annular running surface and method of installation thereof is provided. The shaft seal has a mounting portion configured to be connected to a stationary housing and a seal lip having an annular sealing surface extending between an oil side end and an air side end of the seal lip. The sealing surface is configured to extend axially along a shaft running surface. An annular bridge portion connects the seal lip to the mounting portion. A plurality of webs extend generally radially between the bridge portion and the mounting portion to prevent the seal lip from being inadvertently unfolded during installation or while in use. An annulus can be used to install the shaft seal into a housing and about a shaft without the need for secondary operations.

11 Claims, 8 Drawing Sheets

U.S. PATENT DOCUMENTS

| | | | |
|---|---|---|---|
| 3,941,396 A | 3/1976 | Bailey et al. | |
| 4,037,849 A | 7/1977 | Thumm | |
| 4,106,781 A | 8/1978 | Benjamin et al. | |
| 4,274,641 A | 6/1981 | Cather, Jr. | |
| 4,298,206 A * | 11/1981 | Kojima | 277/626 |
| 4,344,631 A | 8/1982 | Winn | |
| 4,449,717 A | 5/1984 | Kitawaki et al. | |
| 4,585,236 A | 4/1986 | Simmons et al. | |
| 4,611,931 A * | 9/1986 | Brandenstein et al. | 384/477 |
| 4,635,947 A | 1/1987 | Hatayama | |
| 4,643,436 A * | 2/1987 | Jackowski | 29/527.1 |
| 4,685,685 A * | 8/1987 | Iverson | 277/562 |
| 4,721,314 A * | 1/1988 | Kanayama et al. | 277/576 |
| 4,844,484 A * | 7/1989 | Antonini et al. | 277/561 |
| 4,986,553 A | 1/1991 | Preston et al. | |
| 4,995,621 A | 2/1991 | Devouassoux et al. | |
| 5,004,248 A | 4/1991 | Messenger et al. | |
| 5,137,285 A * | 8/1992 | Pick | 277/503 |
| 5,201,528 A * | 4/1993 | Upper | 277/394 |
| 5,292,199 A | 3/1994 | Hosbach et al. | |
| 5,370,404 A | 12/1994 | Klein et al. | |
| 5,509,667 A | 4/1996 | Klein et al. | |
| 5,642,889 A * | 7/1997 | Pauler et al. | 277/552 |
| 5,909,880 A * | 6/1999 | Waskiewicz | 277/561 |
| 5,957,461 A | 9/1999 | Ulrich | |
| 6,298,955 B1 * | 10/2001 | Frost | 188/72.9 |
| 6,428,013 B1 | 8/2002 | Johnston et al. | |
| 6,520,507 B2 | 2/2003 | Pataille et al. | |
| 6,601,855 B1 * | 8/2003 | Clark | 277/549 |
| 6,702,293 B2 | 3/2004 | Endo et al. | |
| 6,860,486 B2 | 3/2005 | Hacker et al. | |
| 7,004,471 B2 | 2/2006 | Bryde et al. | |
| 7,134,669 B2 | 11/2006 | Uhrner | |
| 2003/0006563 A1 | 1/2003 | Cater et al. | |
| 2003/0230850 A1 | 12/2003 | Bruyere et al. | |
| 2006/0022414 A1 | 2/2006 | Balsells | |

* cited by examiner

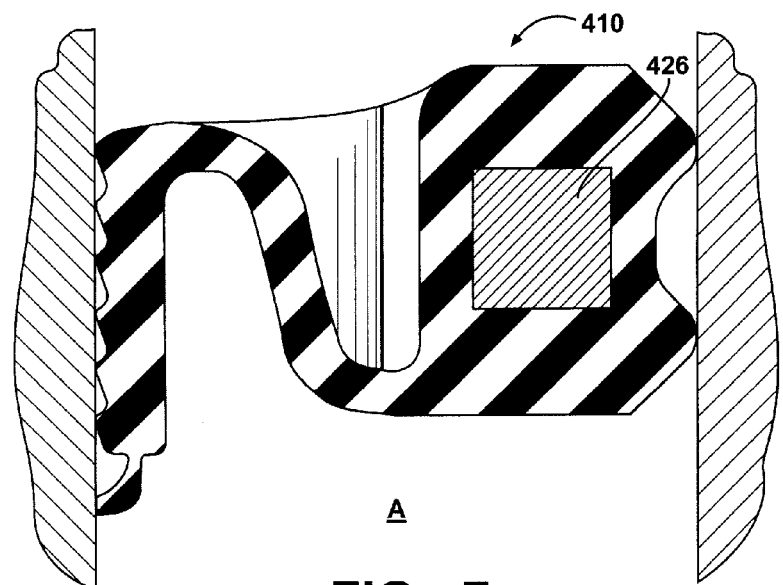
FIG - 7
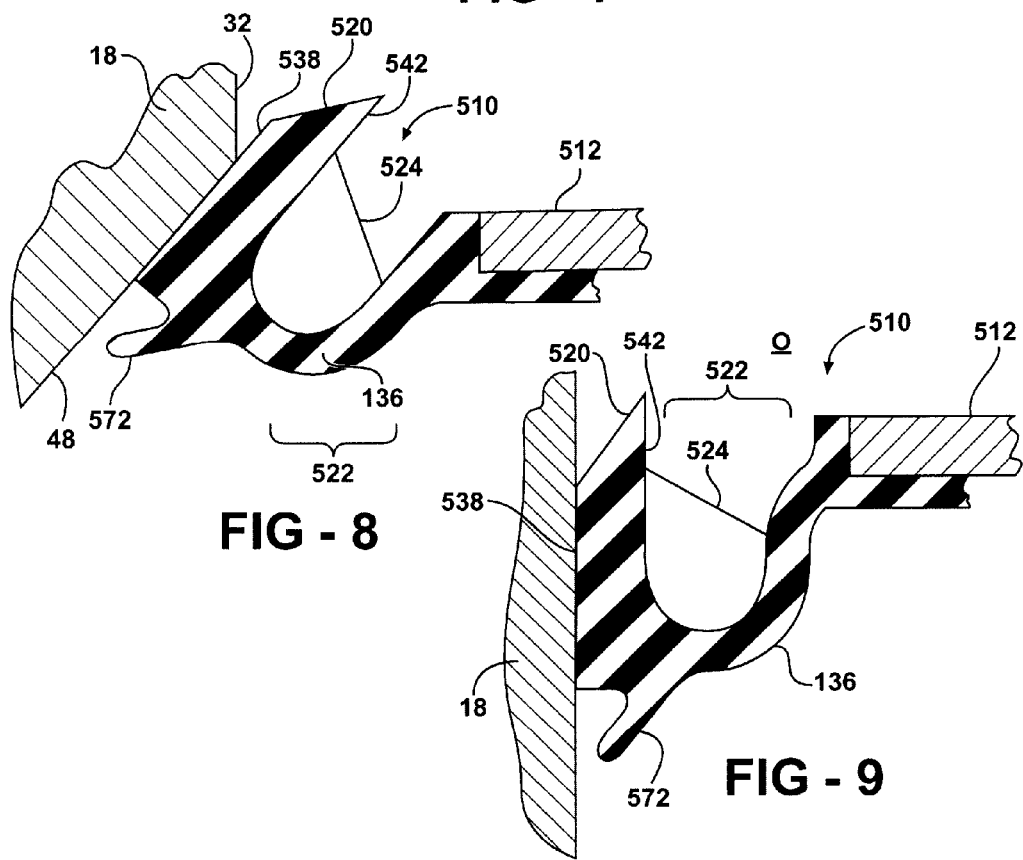
FIG - 8
FIG - 9

DYNAMIC SHAFT SEAL AND METHOD OF INSTALLATION THEREOF

CROSS-REFERENCE TO RELATED APPLICATION

This application claims the benefit of U.S. Provisional Application Ser. No. 60/894,040 filed Mar. 9, 2007, which is incorporated herein by reference in its entirety.

BACKGROUND

1. Field of the Invention

This invention relates generally to oils seals, and more particularly to oil seals for a seal between an outer stationary housing and a central rotating shaft.

2. Related Art

Shaft seals for establishing a fluid tight seal between a stationary housing and a rotating shaft are well known. Continual efforts are made to attain a fluid tight seal, while minimizing the effects of friction between the seal and the rotating shaft. Some shaft seals utilize garter springs to facilitate maintaining a seal lip of the seal in sealing engagement with the shaft. Although these types of seals can prove useful, they typically result in an increased overall cost due to manufacture processes involved and in material cost of the springs. In addition, they can result in increased space requirements to accommodate the spring, and in addition, typically increase the weight of the seal assembly.

In another known shaft seal configuration, a reverse seal lip configuration is provided, wherein the seal lip has a sealing surface for engagement with the shaft and a reverse folded hinge portion lies substantially parallel in overlapping relation to the seal lip in an assembled state. The seal relies largely on the reverse folded configuration of the hinge portion to maintain the sealing surface of the seal lip in sealing engagement with the shaft. Although this configuration can prove useful in establishing a tight seal with relatively minimal friction in use, it does have potential problems both during assembly and in use. During assembly, the hinge portion can unfold if too much friction occurs between the sealing surface of the seal lip and the shaft. If this occurs, the seal needs to be removed and a new seal put in its place. If the problem goes undetected, a seal will not be established between the shaft and the housing, and problems associated with leakage will quickly result. In addition, even if the seal is installed properly, the hinge portion can unfold in use, thereby resulting in leaking problems thereafter. One contributing factor to the hinge portion unfolding in use is an increase in pressure on the oil side relative to the air side of the seal. If the pressure becomes too great on the oil side, the hinge portion can be pushed toward the air side of the seal until it eventually unfolds. As such, this type of seal has potential set backs both in assembly and in use.

SUMMARY OF THE INVENTION

In accordance with one aspect of the invention, a shaft seal for forming a dynamic seal along an axially extending annular running surface is provided. The shaft seal has a mounting portion configured to be connected to a stationary housing and a seal lip having an annular sealing surface extending between an oil side end and an air side end of the seal lip. The sealing surface is configured to extend axially along the running surface. An annular bridge portion connects the seal lip to the mounting portion. A plurality of webs extend generally radially between the bridge portion and the mounting portion.

In accordance with another aspect of the invention, a shaft seal is provided having a mounting portion configured to be connected to a stationary housing and a seal lip having a backing surface and an annular sealing surface extending between an oil side end and an air side end of the seal lip, wherein the sealing surface is configured to extend axially along a running surface of a rotating shaft. An annular hinge region extends radially outwardly from the oil side of the seal lip in reverse folded orientation over the seal lip with an annular pocket being formed between one side of the hinge region and the backing surface of the seal lip. An annular recess is formed between an opposite side of the hinge region facing the mounting portion and the mounting portion. A plurality of reinforcing webs extend through the recess between the hinge region and the mounting portion.

In accordance with yet another aspect of the invention, a method of installing a shaft seal into a bore of a housing and about a shaft is provided. The shaft seal has a mounting portion and a seal lip with a backing surface and an opposite annular sealing surface extending between an oil side end of the seal lip and an air side end of the seal lip. An annular hinge region extends radially outwardly from the oil side of the seal lip in reverse folded orientation over the backing surface of the seal lip. An annular pocket is formed between the hinge region and the backing surface of the seal lip and an annular recess is formed between the hinge region and the mounting portion. The method of installation includes providing an annulus having a predetermined outer diameter and aligning the shaft seal generally concentrically with the bore of the housing. Further, moving the annulus relative to the seal axially into the annular pocket and causing the oil side end of the seal lip to move radially outwardly. Then, pressing the mounting portion of the seal into the bore of the housing with the annulus remaining in the annular pocket. Next, moving the shaft relative to the seal axially beneath the sealing surface with the annulus remaining in the annular pocket. Lastly, moving the annulus relative to the seal axially out of the annular pocket and causing the sealing surface of the seal lip to engage a running surface of the shaft.

BRIEF DESCRIPTION OF THE DRAWINGS

These and other aspects, features and advantages of this invention will become readily appreciated when considered in connection with the detailed description of presently preferred embodiments and best mode, appended claims and accompanying drawings, in which:

FIGS. 5-7 are cross-sectional views of seals constructed in accordance with additional presently preferred aspects of the invention shown in an installed state;

FIG. 8 is a cross-sectional view of a seal constructed in accordance with another presently preferred aspect of the invention shown in a pre-installed state;

FIG. 9 is a cross-sectional view of the seal of FIG. 8 shown in an installed state.

DETAILED DESCRIPTION OF PRESENTLY PREFERRED EMBODIMENTS

Figure 1:
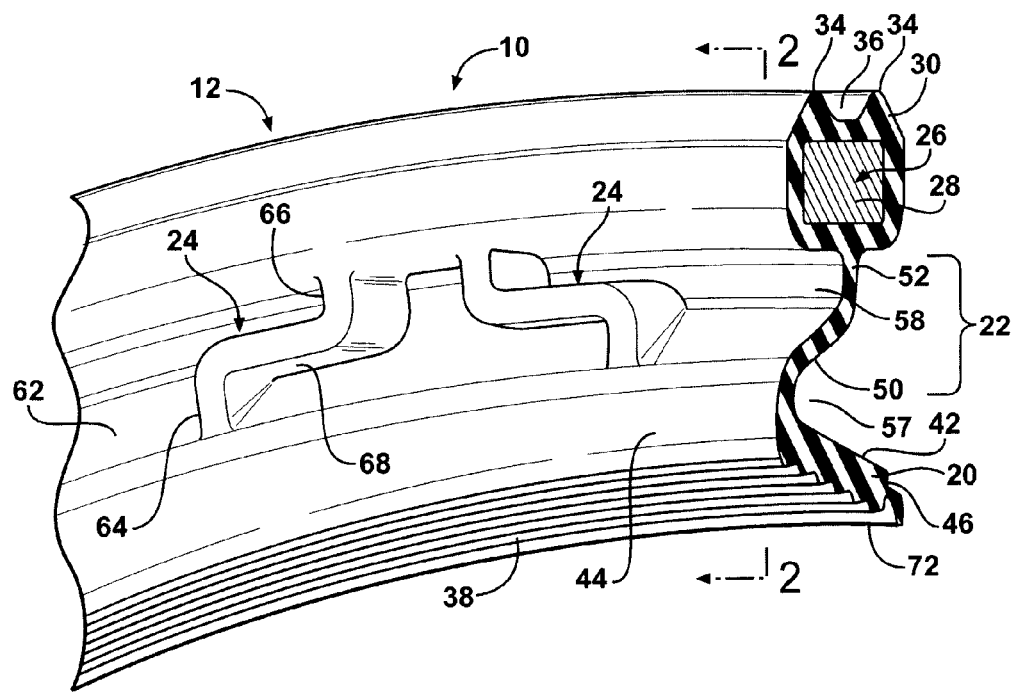
FIG. 1 is a partial perspective view of a seal constructed in accordance with one presently preferred aspect of the invention.
Figure 2:
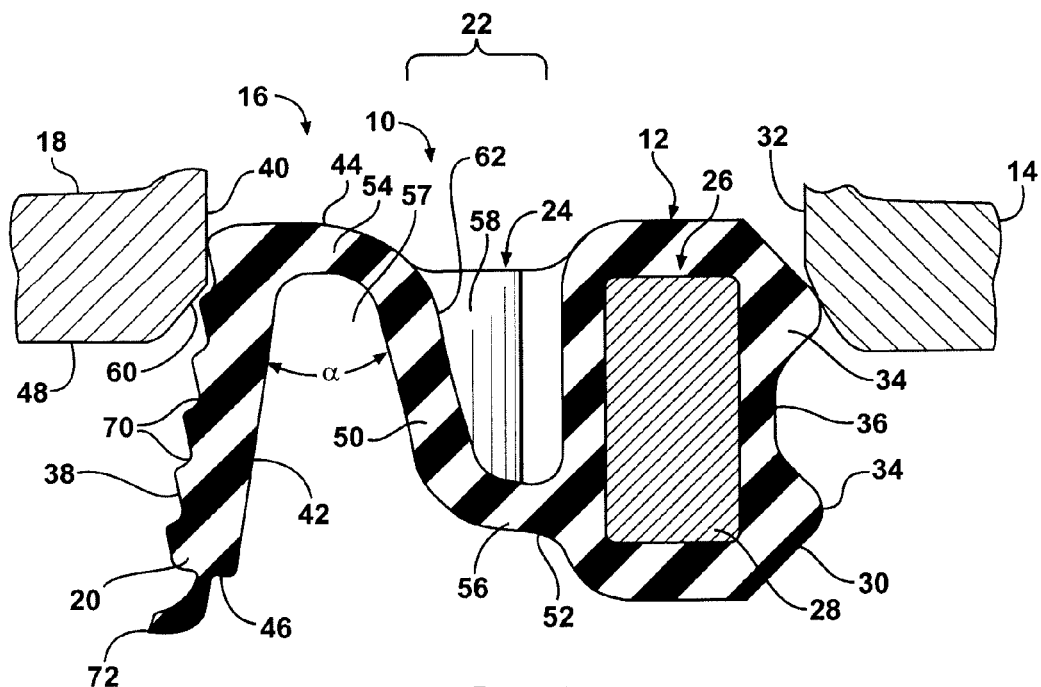
FIG. 2 is a cross-sectional view of the seal of FIG. 1 shown in a pre-installed state.
Figure 3:
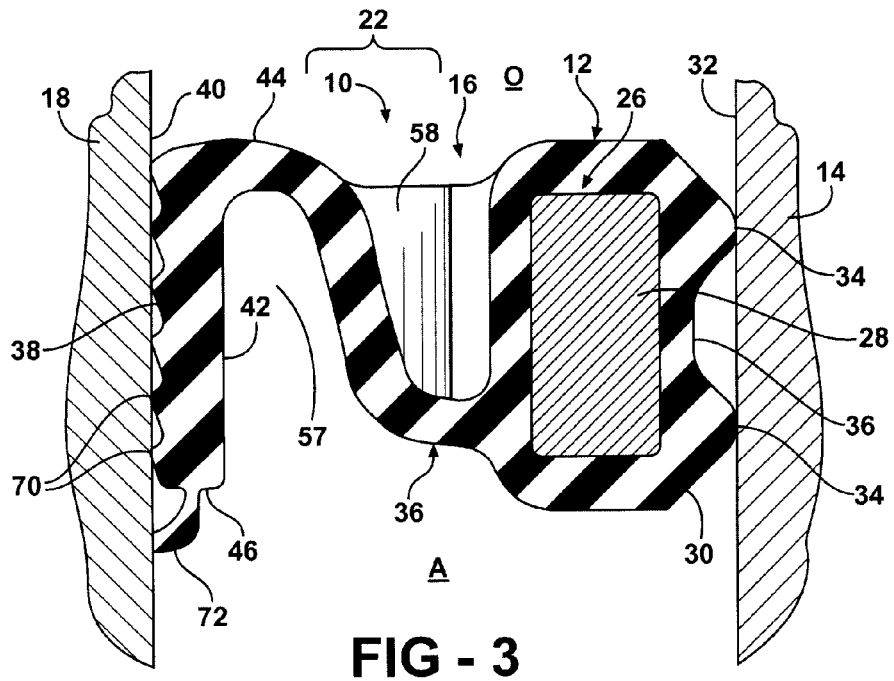
FIG. 3 is a cross-sectional view of the seal of FIG. 1 shown in an installed state.

Referring in more detail to the drawings, FIGS. 1-3 illustrate one embodiment of a shaft seal shown generally at 10 in FIGS. 1-3. The shaft seal 10 includes a structurally rigid angular mounting collar portion 12 adapted for mounting the shaft seal 10 to a stationary housing 14, such as, by way of example and without limitation, a crank case of an engine, about an opening 16 in the housing through which a rotatable shaft 18, such as a crank shaft, extends. A primary seal lip 20 is connected to the mounting collar portion 12 by an intervening bridge portion 22. A plurality of reinforcing ribs or webs 24 extend between the bridge portion 22 and the mounting collar portion 12 and connect the bridge portion 22 to the mounting collar portion 12 at circumferentially spaced locations about the shaft seal 10. The webs 24 serve as reinforcing spokes to provide axial stiffness to the seal assembly 10, while providing good radial flexibility and resiliency to the primary seal lip 20. The axial stiffness aids in installation of the shaft seal 10 by minimizing or preventing altogether the possibility of the bridge portion 22 being turned inside out as the seal assembly 10 is installed over the shaft 18. As such, the shaft seal 10 can be installed about the shaft 16 and within the housing 14 without the use of tools, if desired. Otherwise the shaft seal 10 can be installed through the use of a tool mechanism using an innovative assembly method, discussed in more detail hereafter, if desired.

The mounting collar portion 12 includes a structurally rigid component 26. The rigid component 26 is made from a material that is stiffer than the rest of the shaft seal 10. The rigid component 26 assists in mounting the shaft seal 10 in the housing 14 and adds to the overall structural rigidity of the mounting collar portion 12. The rigid component 26 may take on any of a number of shapes suitable for giving the mounting collar portion 12 sufficient rigidity and enabling it to be mounted in housing 14 in the intended manner. In the illustrated embodiments of FIGS. 1-3, the rigid component 26 is in the form of a single annular ring having a generally rectangular shape in axial cross-section. However, as shown in FIGS. 4, 5, 6 and 7, by way of example, the respective shaft seals 110, 210, 310, 410 may have alternate constructions of the rigid components, such as may include a wound double circular ring 126, such as a key ring (FIG. 4), a single circular ring 226 (FIG. 5), a stamped metal ring structure 326 (FIG. 6) or a ring-like structure 426 (FIG. 7) which may comprise a continuous or split ring and may be made, for example, by slicing a ring from a tubular billet. While a number of shapes have been shown as being suitable for the rigid component, they are merely examples, while these or any other configurations that would be suitable for providing adequate strength and structural rigidity to the seal 10 are contemplated herein.

The rigid component 26 can be formed of a metallic and/or non-metallic rigid core 28 that may be made of a circumferentially continuous and endless piece of material, or of a single strand of material wound into the annular ring. Such a structure gives both axial and radial rigidity and good hoop strength to the mounting collar portion 12. The structural core 28 may be partially or completely over-molded by an annular block or body 30 of elastomeric material, such as rubber or the like. The body of elastomer 30 provides resiliency to the mounting collar portion 12, while the core 28 provides the mounting collar portion 12 with structural rigidity.

The mounting collar portion 12 is configured to be pressed into a bore 32 of the housing 14. The core 28 may be exposed at the outer diameter of the mounting collar 12 and thus, may engage the wall of the bore 32 directly, or the core 28 may be covered by a thin layer of elastomer to the promote and enhance forming a fluid tight seal between the housing 14 and the shaft seal 10. To further facilitate forming a reliable fluid tight seal, the mounting collar 12 may further include bore retention and seal enhancing features, such as one or more annular ribs 34 which may be made of the same elastomer material as that of the body of elastomer material 30. As illustrated, where two or more or the ribs 34 are incorporated, an annular channel 36 is formed between adjacent ribs 34. As such, when the ribs 34 become at least partially elastically deformed under radial compression, a radial static fluid tight seal is perfected between the seal assembly 10 and the bore 32 of the housing 14. The fluid tight seal is enhanced by having the fully enclosed annular sealing channel 36 formed between the adjacent ribs 34. If, for any reason, fluid or contamination should leak past one of the ribs 34, the fluid or contamination can be captured within the respective channel 36 and thus, be prevented from passing beyond the next rib 34 and completely through the seal assembly 10.

The shaft seal 10 includes the primary seal lip 20 that is spaced radially inwardly from the rigid component 26 by the bridge portion 22. In the installed condition, the shaft seal 10 has a fluid or oil side O and an axially opposite environmental or air side A as illustrated best in FIG. 3. The primary seal lip 20 has a collar-like shape with a sealing surface 38 that seals about an outer diameter running surface 40 of the shaft 18, and an opposite backing surface 42. In this embodiment, the bridge portion 22 connects to the primary seal lip 20 at a fluid side end 44 of the seal lip 20. The seal lip 20 extends from the fluid side end 44 to an axially opposite air side end 46. Apart from the connection of the seal lip 20 to the bridge portion 22 at the fluid side end 44, the seal lip 20 is otherwise unsupported along its length, such that the backing surface 42 is free of any supports, springs or connection to the mounting collar portion 12. As shown best in FIG. 2, the collar-like primary seal lip 20 may be formed with a slight funnel or frustum shape such that, in the relaxed uninstalled state, the seal lip 20 has a greater diameter at the fluid side end 44 than at the air side end 46. This frustum shape of the primary seal lip 20 in the relaxed state provides a slight taper to present a slightly wider mouth at a free end 48 of the shaft 18 when initially installing the shaft seal 10 in the bore 32 and about the shaft 18.

As shown in the embodiment of FIGS. 1-3, the bridge portion 22 has a hinge region 50 that extends from the fluid side end 44 back over the primary seal lip 20 in overlying but radially outwardly spaced relation to the backing surface 42 of the seal lip 20 toward the air side end 46 of the seal lip 20. The bridge portion 22 also has an annular radial leg 52 that transitions from the hinge region 50 and extends radially outwardly to join the hinge region 50 of the bridge portion 22 to the mounting collar portion 12. The reverse extended or folded hinge region 50 serves as an annular hinge for supporting the primary seal lip 20. The reverse folded hinge region 50 is very soft and compliant in the radial direction and thus, allows the primary seal lip 20 to float radially for initial alignment with the shaft 18 during installation, and to move or float radially with the shaft 18 following installation in use in the event that the shaft 18 may be slightly misaligned axially with respect to the axis of the bore 32 (e.g., shaft run out condition).

The reverse fold of the hinge region 50 presents two pivot or hinge points or regions, a first hinge region 54 being located at the leading oil side O of the hinge region 50 at the curved juncture where it joins to the primary seal lip 20, and a second hinge region 56 being axially spaced from the first hinge region 54 toward the air side A of the seal assembly 10. In addition to being axially spaced, the first and second hinge regions 54, 56 may also be radially spaced from one another. As illustrated in FIG. 3, the hinge region 50 may form an acute angle α with respect to the primary seal lip 20 upon being assembled, such that the hinge region 50 diverges from the seal lip 20 in the direction of the air side A of the seal 10 to form a recessed annular pocket 57 between the seal lip 20 and the hinge region 50. This angle α is less than 90 degrees and preferably less than 45 degrees and more preferably between about 5-30 degrees upon assembly.

An annular pocket or recess 58 is formed between the reverse extending hinge region 50 and the body 30 of the mounting collar portion 12. The reverse hinge region 50 is radially in line with the mounting collar portion 12 but spaced therefrom by the recess 58. The plurality of the ribs or webs 24 extend across the recess 58 and join the hinge region 50 to the mounting collar portion 12. The webs 24 can also be joined to the radial leg 52 of the bridge portion 22. The webs 24 are provided at circumferentially spaced locations along the length of the circumference of the reverse hinge region 50. According to one presently preferred aspect, each of the webs 24 are spaced equidistant from one another about the circumference of the seal 10. According to another presently preferred aspect, pairs of adjacent webs 24 are spaced equidistant from one another about the circumference of the seal 10. As such, the force required to radially compress the seal 10 about its circumference is substantially constant or uniform. As noted, the webs 24 provide axial stiffness to the seal assembly 10 in the region of the reverse hinge region 50, while maintaining good radial flexibility of the primary seal lip 20 and also the hinge region 50. The axial stiffness imparted by the webs 24 minimizes or prevents altogether the possibility of the hinge region 50 being turned inside out as the seal assembly 10 is installed over the shaft 16. As illustrated by the comparison of FIGS. 2 and 3, as the leading fluid or oil side end 44 of the primary seal lip 20 is guided first over a chamfered nose 60 of the shaft 18 and then onto the outer diameter shaft running surface 40, an axial force is exerted on the primary seal lip 20 in the direction of the air side A of the seal assembly 10. This has a tendency to draw or pull the primary seal lip 20 in the direction of the air side A. There is a possibility that the convolute formed by the primary seal lip 20 and hinge region 50 could be drawn axially far enough where the hinge region 50 unfolds and becomes oriented or pointed in the opposite direction toward the air side A, thereby eliminating the reverse hinge portion 50 and annular recess 58 formed thereby. However, when the axial installation forces are exerted on the seal lip 20 and hinge region 44 in the air side direction, the webs 24 are caused to be tensioned, thereby holding the seal lip 20 and hinge region 50 in their respective places. Accordingly, the primary seal lip 20 is maintained in a reverse folded configuration relative to the hinge region 50, and thus, is prevented from attaining such severe axial displacement during installation or while in use.

As shown best in FIG. 1, the webs 24 extend between a radially outer surface 62 of the hinge region 50 and the mounting collar portion 12. The webs 24 are represented here, by way of example and without limitation, as being generally Z-shaped and/or S-shaped such that adjacent webs 24 are configured in generally mirrored relation to one another. The webs 24 have an inner radial leg 64, and outer radial leg 66 and a laterally extending intermediate leg 68 extending between and attached to the respective legs 64, 66. As their names imply, both the radial legs 64, 66 extend generally in a radial direction, while the lateral leg 68 extends generally circumferentially to interconnect the legs 64, 66. The radial legs 64, 66 provide a predetermined amount of radial stiffness between the hinge region 50 and the mounting collar portion 12, while the lateral leg 68 is largely responsible for providing a predetermined amount of flexibility and compliance between the hinge region 50 and the mounting collar portion 12 to allow for some relative radial movement therebetween during installation and in use. The intermediate leg 68 is spaced from the mounting collar portion 12 and the hinge region 50 and is shown here, by way of example and without limitation, as being spaced equidistantly therebetween. Accordingly, the hinge region 50 and mounting collar portion 12 can accommodate a certain degree of radial misalignment between the shaft 18 and the housing 14 and/or an out-of-round shaft running surface 40, while also maintaining a fluid-tight seal between the seal lip sealing surface 38 and the shaft running surface 40.

The elastomer body 30 of the mounting collar 12, the bridge portion 22 and the primary seal lip 20 all may be molded as one piece from the same elastomer material. Alternatively, the primary seal lip 20 may include a PTFE liner (not shown) on the sealing surface 38.

The primary seal lip 20 may further include various features formed on the sealing surface 38. FIGS. 1-3 illustrate a series of hydrodynamic features 70 molded in the sealing surface 38 which act to enhance the sealing capability of the primary seal lip 20 by pumping any oil that finds its way under the lip 20 back toward the oil side O of the seal 10.

The hydrodynamic features 70 may be formed as a helical groove or ridge with one or multiple starts; concentric grooves or ridges with a continuous or variable cross-section (by concentric it is meant that there are a plurality of circumferentially continuous individual grooves or ridges spaced axially from one another); concentric grooves or ridges with intermittent hydrodynamic aids; or intermittent recessed or protruded hydrodynamic aids, and other configurations, as desired.

Extended off the air-side end 46 of the primary seal lip 20 is a contaminant exclusion lip 72 made of the same elastomer as that used to make the primary seal lip 20. The exclusion lip 72 can ride in abutment against the shaft running surface 40 or be slightly spaced from the surface 40 by a gap. Regardless, the exclusion lip 72 is operative to keep outside contaminants from entering the sealing interface 38 of the primary seal 20 and the fluid containment area on the oil side O of the seal assembly 10.

FIG. 3 shows the shaft seal 10 in the fully installed condition. During operation, the sealed oil (or other fluid) environment on the oil side O of the seal 10 may be pressurized relative to atmospheric pressure on the air side A, so as to exert an axial outward force on the bridge portion 22 of the seal 10. The webs 24 stiffen the bridge portion 22 axially and thus, provide at least some resistance to axial deflection of the bridge portion 22 toward the air side A of the seal 10. To the extent some axial displacement of the bridge portion 22 does occur due to oil pressure, the unfolding action of the hinge region 50 of the bridge portion 22 will cause the hinge portion 50 to swing radially inwardly due to the shape of the hinge portion 50 and arrangement of its corresponding hinge regions 54, 56. This, in turn, will cause the primary seal lip 20 to be pressed radially inwardly against the shaft 18 to effectively increase the sealing force of the seal lip 20 against the shaft running surface 40 under the action of the fluid pressure.

Figure 4:
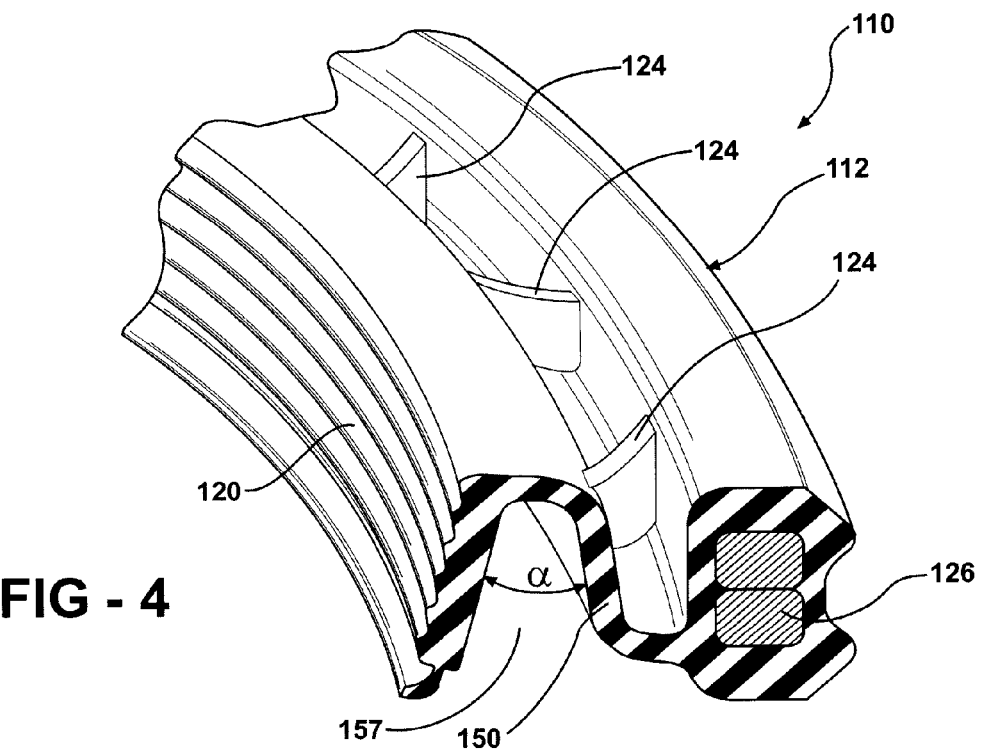
FIG. 4 is a partial perspective view of a seal constructed in accordance with another presently preferred aspect of the invention.
Figure 5:
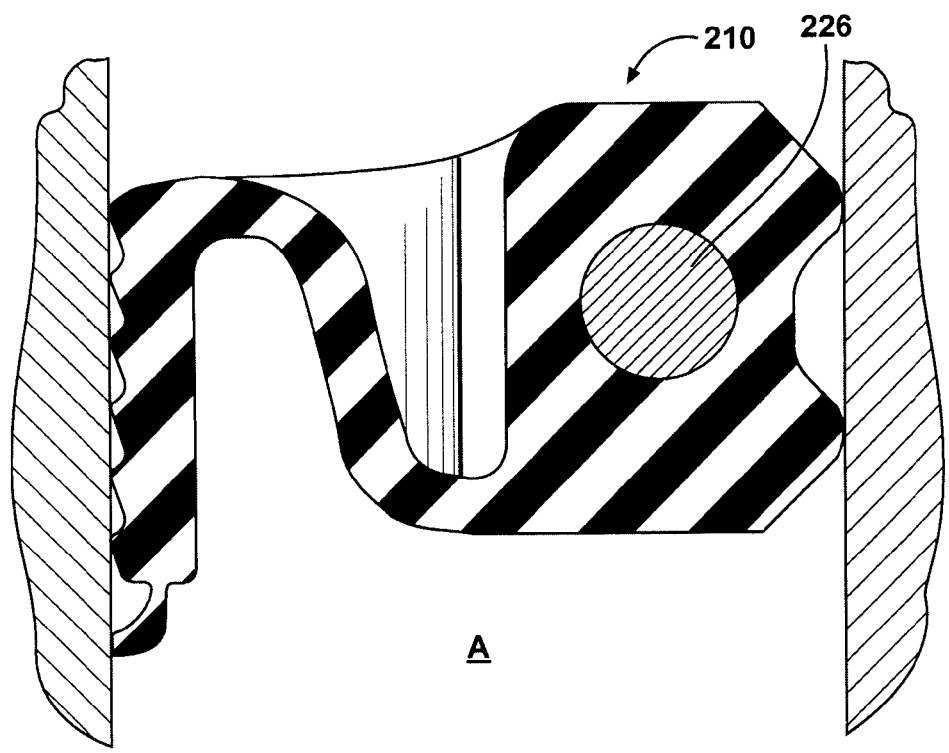
Figure 6:
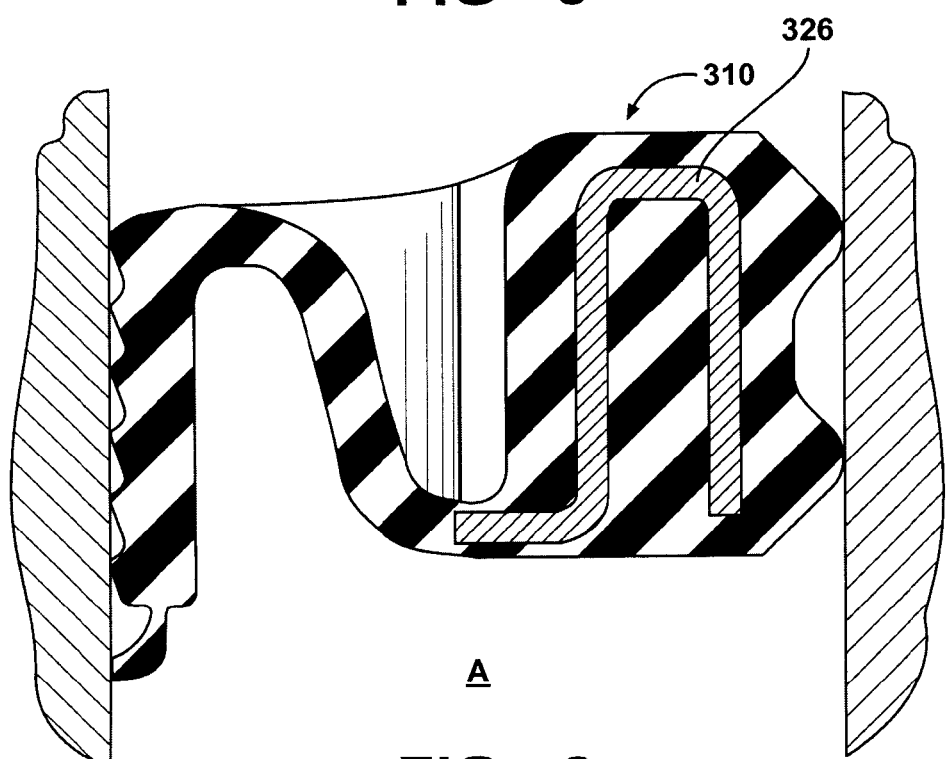
Figure 10:
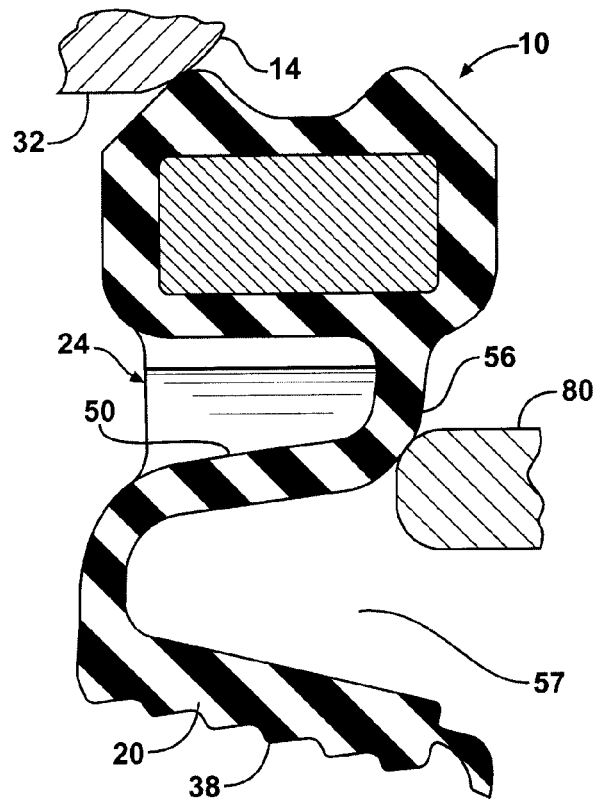
FIGS. 10-17 illustrate a method of installing a seal into a housing and onto a shaft according to yet another aspect of the invention.

In another presently preferred embodiment, as shown in FIG. 4, wherein the same reference numeral offset by 100 are used to identify similar features discussed above, a shaft seal 110 has webs 124 that, rather than being generally Z-shaped or S-shaped, extend generally radially and linearly between the hinge region 150 and the mounting portion 112, but may be angled with respect to a true radial direction. As with the webs 24, the adjacent webs 124 can extend in opposite directions in non-parallel relation to one another, such that they are in generally mirrored relation with one another. As such, alternating webs or every other web 124 extends along the same general radial direction in parallel relation to one another. The angled arrangement of the webs 124 serves to reduce the resistance to radial movement of the primary seal lip 120 to accommodate such movement during installation and shaft run out and/or misalignment, while retaining the axial stiffing effect of the webs 124 in holding the primary seal lip 120 and hinge portion 150 against severe axial displacement relative to the mounting collar 112 during installation on the shaft, as discussed above. The webs 124 can be of any number or design configuration and could be radial if desired.

Another embodiment of a shaft seal 510 constructed in accordance with the invention is shown in FIGS. 8 and 9. The same reference numerals are used to designate like features discussed above, but are offset by 500.

The shaft seal 510 has a mounting collar portion, wherein the mounting collar portion is typically a metal case 512, but could be constructed of any suitable configuration, such as that described above, if desired. A bridge portion 522, primary seal lip 520 and contaminant exclusion lip 572 are molded of one piece of elastomer and bonded to the metal case 512, wherein the bridge portion 522 extends between the seal lip 520 and the metal case 512. In this embodiment, the primary seal lip 520 extends toward the oil side O, but the radially inner sealing surface 538 is angled in the shape of a frustum or funnel in its relaxed state with an open end of the frustum facing the free end 48 of the shaft 18 so that the seal lip 520 can be installed over the free end 48 without the use of tools to guide the seal lip 520. A plurality of webs 524 extend between the bridge portion 522 and the mounting portion 512, and is shown here as extending between a backing surface 542 of the primary seal lip 520 and the mounting portion 512. Once installed, as shown in FIG. 9, any pressure on the oil side O will cause an associated increase in pressure of the seal lip 520 against the shaft 18 due to the reverse fold of the seal lip 520 relative to the bridge portion 522. As described above, the webs 524 can be placed under tension during assembly and in use, and are of sufficient strength to prevent the primary seal lip 520 from being unfolded to maintain the primary seal lip 520 in its intended sealing position against the shaft 18. The primary seal lip 520 may have the same alternative hydrodynamic aids as that described above for the first embodiment and may optionally include a PTFE liner.

Figure 11:
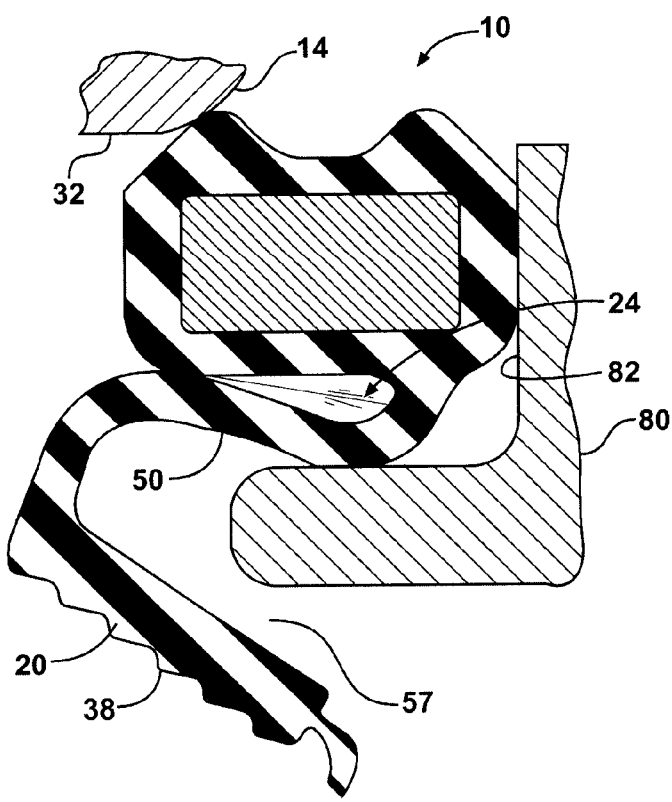

According to another aspect of the invention, a method of installing a shaft seal constructed in accordance with the invention is provided. As shown in FIGS. 10-17, the method of installation includes providing an annulus 80 having a predetermined diameter sized for axial sliding receipt into the pocket 57, 157 of the respective shaft seal 10, 110. Further discussion is with reference to the shaft seal 10, although the method is equally applicable to the shaft seal 110. The outer diameter of the annulus 80 is generally about the diameter established by the second hinge region 56 of the hinge region 50. As such, as shown in FIG. 11, upon initiating and continuing the axial insertion of the annulus 80 at least partially into the pocket 57, the hinge region 50 is caused to expand radially outwardly, thereby causing the seal lip 20 to be radially expanded and the pocket 57 to be substantially collapsed, thereby causing the webs 24 to be radially compressed. The annulus 80 is moved axially into the pocket 57 until a flange 82 extending radially outwardly from the annulus 80 is brought into engagement with an end face of the mounting collar portion 12.

Figure 12:
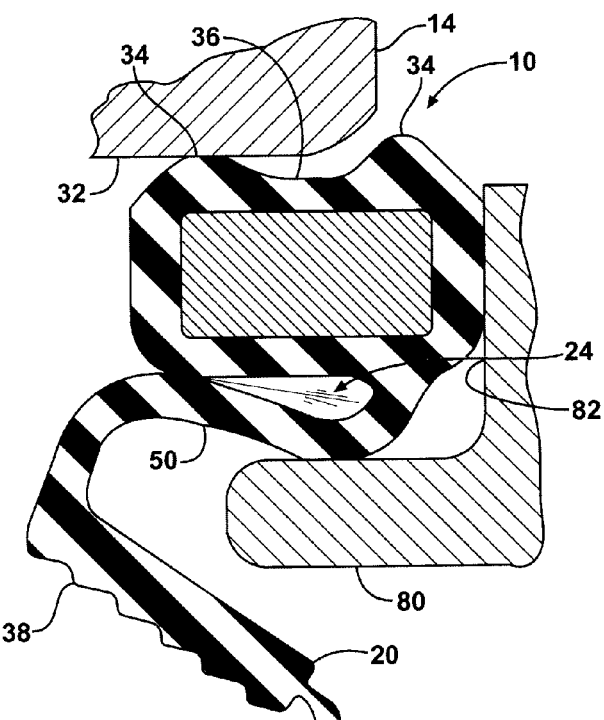
Figure 13:
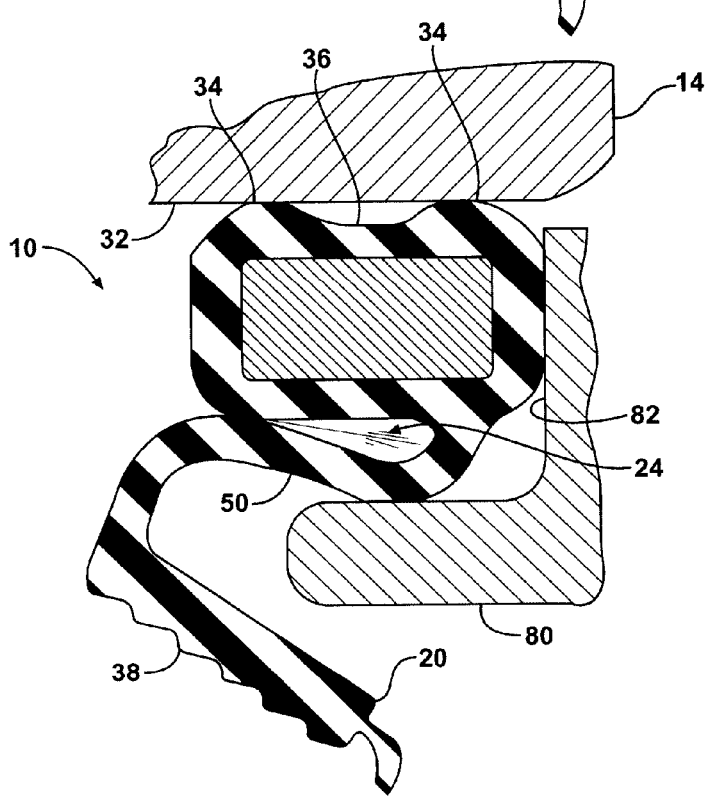

As shown in FIG. 12, the flange 82, being brought into engagement with the mounting collar portion 12, exerts an axial force sufficient to move the seal 10 into the bore 32 of the housing 14. As the seal 10 is guided axially into the bore 32, the ribs 34 are compressed slightly to create an interference fit of the seal 10 with the housing 14. As shown in FIG. 13, the flange 82 is preferably sized for at least partial receipt in the bore 32 to allow the seal 10 to be fully inserted without the need for secondary operations. Upon the seal 10 being fully inserted in the bore 32, as mentioned, the ribs 34 are partially compressed, however, preferably not to the degree that the channel 36 is fully collapsed. Accordingly, the channel 36 remains at least in part between the ribs 34 to provide enhanced sealing protection, as discussed above.

Figure 14:
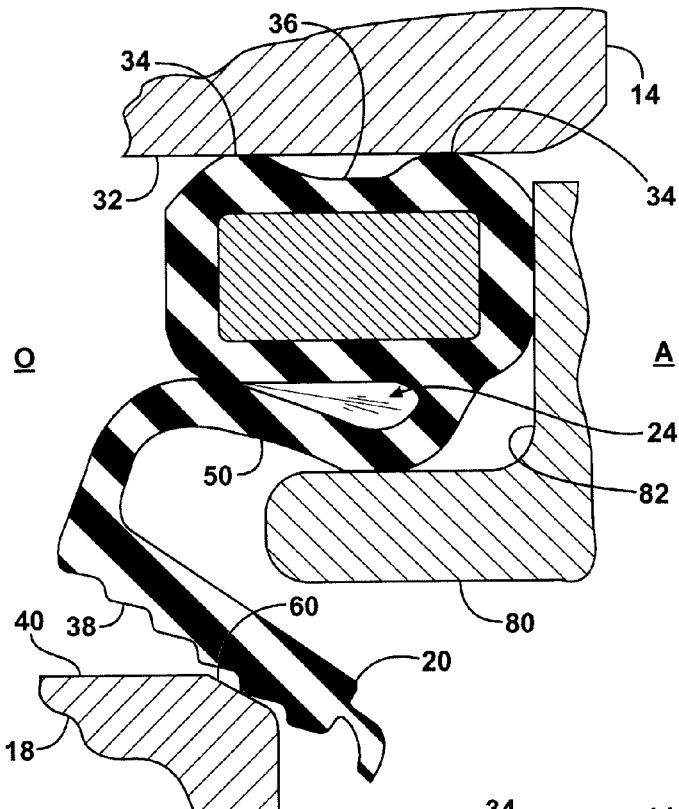
Figure 15:
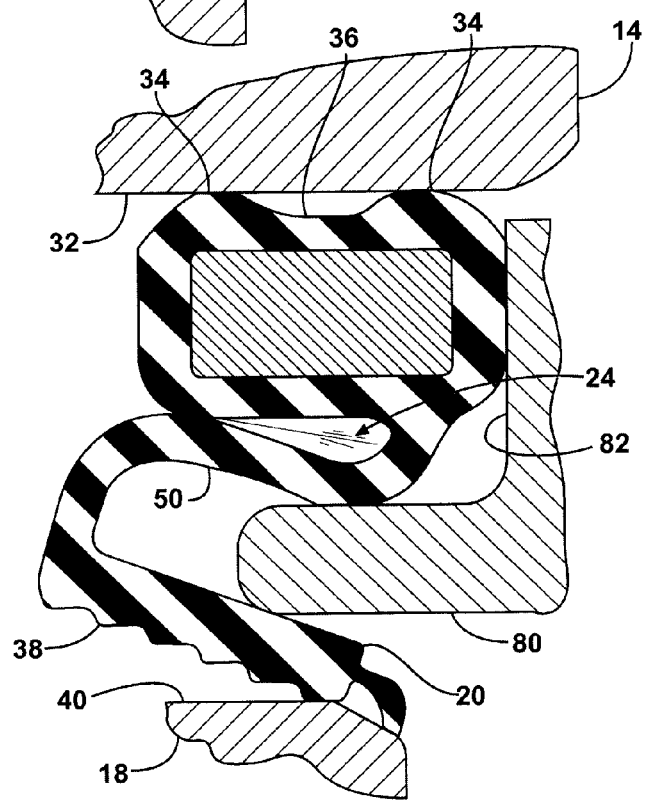
Figure 16:
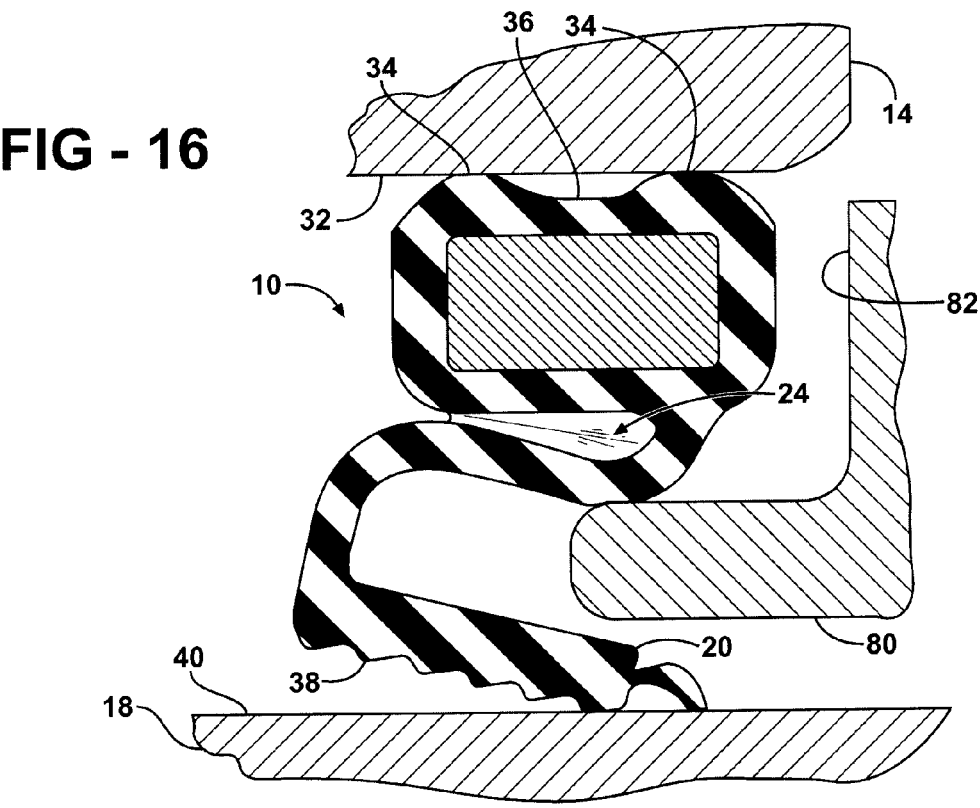
Figure 17:
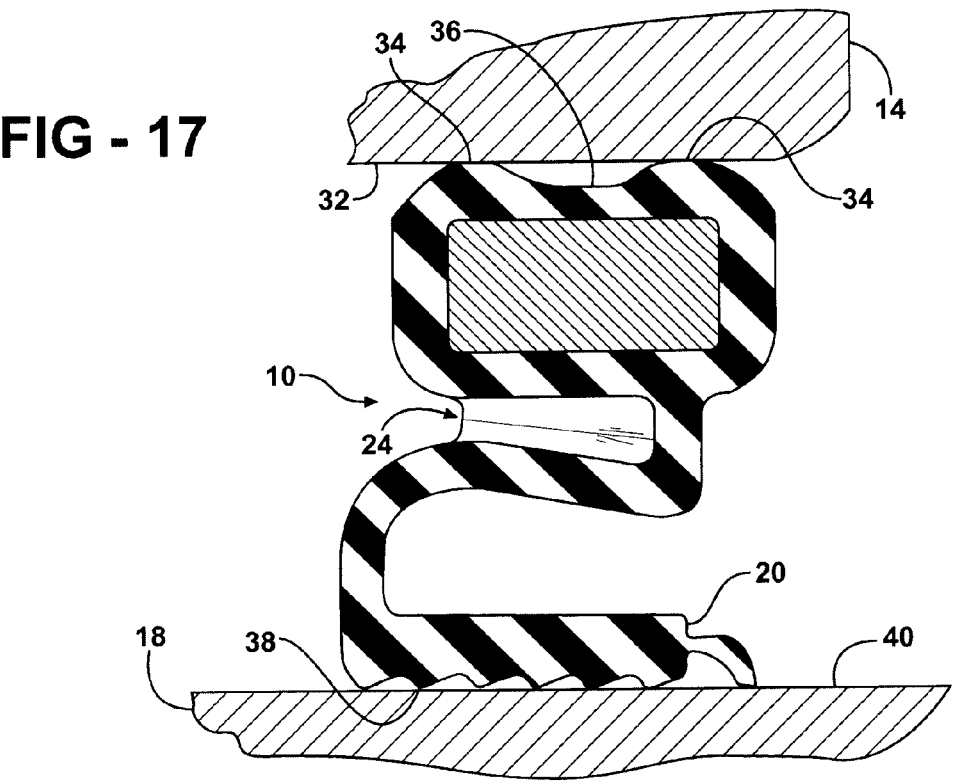

As show in FIG. 14, with the seal 10 fully inserted in the bore 32, the shaft 18 is moved in a direction axially from the oil side O toward the air side A, wherein the chamfered nose 60 of the shaft 18 engages the inclined sealing surface 38 of the primary seal lip 20. During this stage, the annulus 80 preferably remains engaged with the hinge region 50 to maintain the seal lip 20 in an inclined orientation to facilitate assembly of the shaft 18 through the seal 10. As shown in FIG. 15, the shaft 18 is moved axially toward the annulus 80 until the running surface 40 of the shaft is fully received beneath the sealing surface 38 of the seal 10. Thereafter, as shown in FIG. 16, the annulus 80 is moved axially away from the seal 10 until it is completely withdrawn, as shown in FIG. 17, wherein the seal 10 takes on its fully assembled position within the housing 14 and about the shaft 18, whereupon the pocket 57 and webs 24 are substantially restored to an uncollapsed state.

It is to be understood that other embodiments of the invention which accomplish the same function and method of installation are incorporated herein within the scope of any ultimately allowed patent claims. For example, it is to be understood that the method of assembly could be different, such that the seal 10 could be inserted into the bore 32 and onto the shaft 18 at the same time. In addition, the seal 10 could be installed on the shaft 18 first, and then into the bore 32. Accordingly, the description of the presently preferred embodiments above is not meant to be limiting, but rather exemplary of only some embodiments that fit within the scope of the claims.

What is claimed is:

1. A shaft seal for forming a dynamic seal along an axially extending annular running surface, comprising:
    a mounting portion configured to be connected to a stationary housing;
    a seal lip having an annular sealing surface extending between an oil side end and a free air side end, said sealing surface being configured to extend axially along the running surface, said oil side end having a greater diameter than said free air side end in an uninstalled state;
    an annular bridge portion connecting the seal lip to the mounting portion;
    a plurality of webs extending generally radially between said bridge portion and said mounting portion;
    wherein said bridge portion includes a hinge region extending radially outwardly from said oil side of said seal lip at an angle less than 90 degrees from said seal lip and in reverse folded orientation over said seal lip toward said free air side end of said seal lip;

wherein an annular pocket is formed between said hinge region and said seal lip and an annular recess is formed between said hinge region and said mounting portion, said webs being equidistantly spaced circumferentially about said hinge region and extending from said hinge region to said mounting portion within said annular recess; and wherein said annular pocket is free from support.

2. The shaft seal of claim 1 wherein said webs extend linearly between said hinge region and said mounting portion, adjacent ones of said webs extending in non-parallel relation to one another.

3. The shaft seal of claim 2 wherein ever other web extends generally parallel to one another.

4. A shaft seal for forming a dynamic seal along an axially extending annular running surface, comprising:
   a mounting portion configured to be connected to a stationary housing;
   a seal lip having an annular sealing surface extending between an oil side end and an air side end, said sealing surface being configured to extend axially along the running surface;
   an annular bridge portion connecting the seal lip to the mounting portion;
   a plurality of webs extending generally radially between said bridge portion and said mounting portion;
   wherein said bridge portion includes a hinge region extending radially outwardly from said oil side of said seal lip in reverse folded orientation over said seal lip;
   wherein an annular pocket is formed between said hinge region and said seal lip and an annular recess is formed between said hinge region and said mounting portion, said webs extending between said hinge region and to said mounting portion; and
   wherein each of said webs have a pair of radially extending legs interconnected by an intermediate laterally extending leg.

5. A shaft seal, comprising:
   a mounting portion configured to be connected to a stationary housing;
   a seal lip having a backing surface and an opposite annular sealing surface extending between an oil side end and a free air side end, said sealing surface being configured to extend axially along a running surface of a rotating shaft, said oil side end having a greater diameter than said free air side end in an uninstalled state;
   an annular hinge region extending radially outwardly from said oil side of said seal lip in reverse folded orientation over said seal lip toward said free air side end with an annular pocket being formed between one side of said hinge region facing said seal lip and said backing surface of said seal lip and an annular recess being formed between another side of said hinge region facing said mounting portion and said mounting portion,. said annular recess facing said oil side end; and
   a plurality of reinforcing webs extending only through said recess between said hinge region and said mounting portion, said webs facing said oil side end and being equidistantly spaced circumferentially about said hinge region.

6. The shaft seal of claim 5 wherein said mounting portion has an outer diameter sized for an interference fit in a bore of the stationary housing.

7. The shaft seal of claim 6 wherein said outer diameter has a plurality of circumferentially extending ribs spaced from one another by an annular channel, said ribs being sized for partial compression and said annular channel remaining between said ribs upon being press fit into the bore.

8. The shaft seal of claim 5 wherein said webs extend linearly between said hinge region and said mounting portion, adjacent ones of said webs extending in non-parallel relation to one another.

9. The shaft seal of claim 8 wherein ever other web extends generally parallel to one another.

10. A shaft seal, comprising:
    a mounting portion configured to be connected to a stationary housing;
    a seal lip having a backing surface and an opposite annular sealing surface extending between an oil side end and an air side end, said sealing surface being configured to extend axially along a running surface of a rotating shaft;
    an annular hinge region extending radially outwardly from said oil side of said seal lip in reverse folded orientation over said seal lip with an annular pocket being formed between one side of said hinge region facing said seal lip and said backing surface of said seal lip and an annular recess being formed between another side of said hinge region facing said mounting portion and said mounting portion;
    a plurality of reinforcing webs extending through said recess between said hinge region and said mounting portion; and
    wherein each of said webs have a pair of radially extending legs interconnected to one another by a laterally extending intermediate leg, said intermediate leg being spaced from said backing surface of said seal lip and said mounting portion.

11. The shaft seal of claim 10 wherein adjacent ones of said webs are mirror images of one another.

* * * * *